(12) United States Patent
Songa et al.

(10) Patent No.: US 12,530,668 B2
(45) Date of Patent: Jan. 20, 2026

(54) SYSTEMS AND METHODS OF CONTROLLING POINT OF SALE SYSTEMS

(71) Applicant: Walmart Apollo, LLC, Bentonville, AR (US)

(72) Inventors: Ravi Kiran Songa, Bentonville, AR (US); Surbhi Dhariwal, Bentonville, AR (US); Raisa Mukadam, Carrollton, TX (US); Darshini Priya Konanki, Centerton, AR (US); Nhu Quy Nguyen, Bentonville, AR (US); Brandy L. Metzner, Bentonville, AR (US); Rahul Jain, Bengaluru (IN); Veera Kishon Kumar Mucherla, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 320 days.

(21) Appl. No.: 18/106,167

(22) Filed: Feb. 6, 2023

(65) Prior Publication Data

US 2024/0265366 A1   Aug. 8, 2024

(51) Int. Cl.
    *G06Q 20/20* (2012.01)
    *G06N 20/00* (2019.01)

(52) U.S. Cl.
    CPC ........... *G06Q 20/202* (2013.01); *G06N 20/00* (2019.01)

(58) Field of Classification Search
    CPC ............................ G06Q 20/202; G06N 20/00
    See application file for complete search history.

(56) References Cited

U.S. PATENT DOCUMENTS

| | | | |
|---|---|---|---|
| 2021/0027357 A1 | 1/2021 | Bonfigli | |
| 2021/0056580 A1* | 2/2021 | Walker | G06Q 30/0222 |
| 2021/0374758 A1 | 12/2021 | Hochma | |
| 2021/0398100 A1 | 12/2021 | Gabriele | |
| 2022/0067691 A1 | 3/2022 | Storiale | |
| 2022/0164779 A1 | 5/2022 | Bloy | |
| 2023/0368290 A1* | 11/2023 | Peters | G06Q 40/03 |

* cited by examiner

*Primary Examiner* — Allen C Chein
(74) *Attorney, Agent, or Firm* — Foley IP Law, PLLC

(57) ABSTRACT

Some embodiments provide systems comprises: a customer database; a product database; a training data database; a customer evaluation system configured to implement one or more machine learning acceptance probability models to identify an acceptance likelihood factor, and determine whether the each respective customer has a corresponding acceptance likelihood factor greater than a likelihood threshold value; and a plurality of point of sale (POS) systems configured to complete sales transactions, obtain customer identifying information, and communicate the customer identifying information to the customer evaluation system; wherein the customer evaluation system is configured to communicate customer information to the payment method offer entity when the customer has an acceptance likelihood factor greater than a likelihood threshold value, receive authorization to present the customer with a payment method offer, and to present the payment method offer.

14 Claims, 6 Drawing Sheets

SYSTEMS AND METHODS OF CONTROLLING POINT OF SALE SYSTEMS

TECHNICAL FIELD

This invention relates generally to retail point of sale system control.

BACKGROUND

Retail stores use point of sale (POS) systems to complete sales. These POS systems can provide customers information during and/or after a checkout purchasing transaction. Such information can be limited to product information and/or pricing information.

BRIEF DESCRIPTION OF THE DRAWINGS

Disclosed herein are embodiments of systems, apparatuses and methods pertaining to the transformation of information for use in the control of point of sale (POS) systems in presenting offers to customers. This description includes drawings, wherein.

Figure 1:
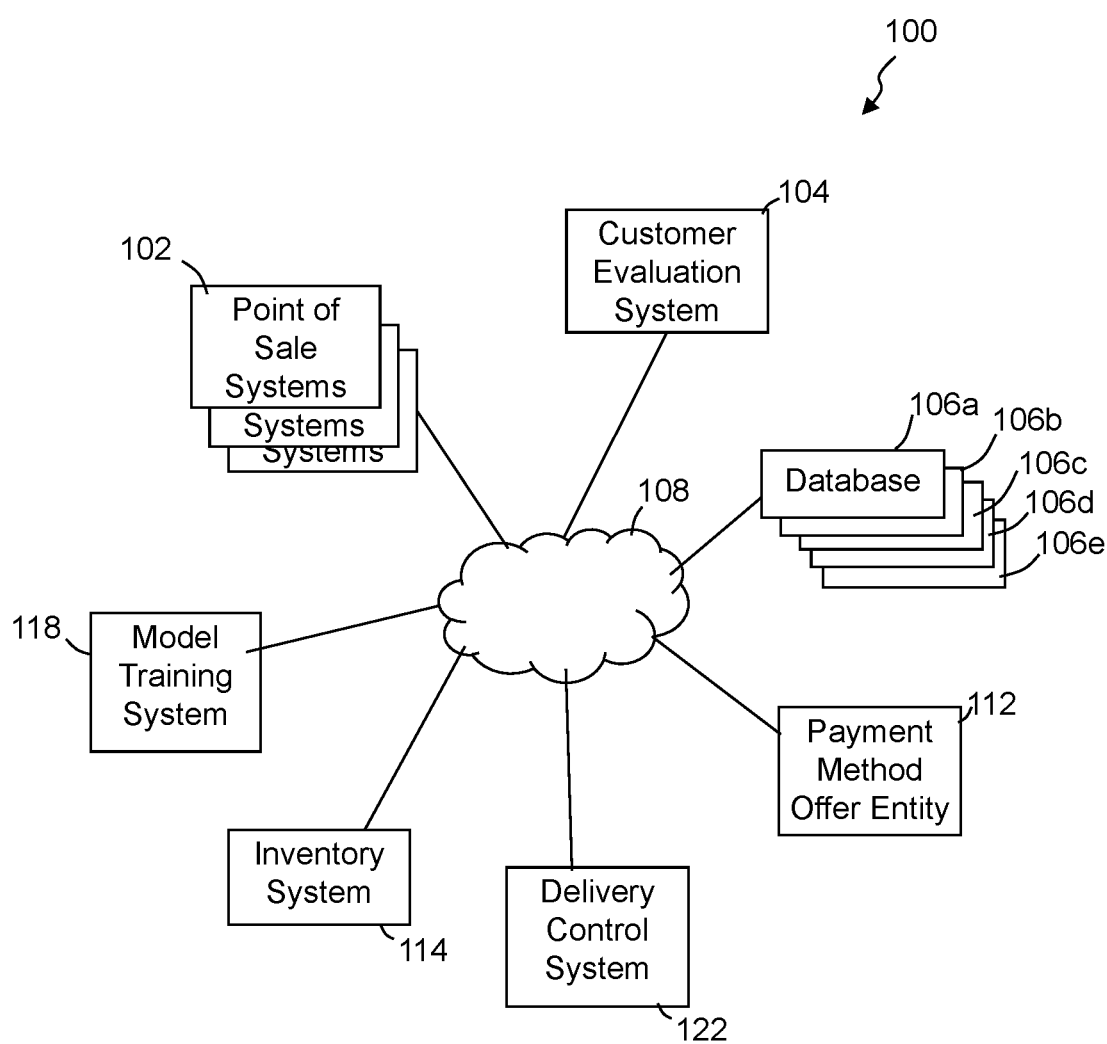
FIG. 1 illustrates a simplified block diagram of an exemplary retail point of sale control system to control retail point of sale (POS) systems of one or more retail entities and to complete product sales and further complete payment method offers, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Some embodiments are configured to control retail point of sale (POS) systems in response to identifying, based at least in part on pre-processing, that a customer has a threshold likelihood of accepting a credit card offer while the customer is presented at the POS system in performing a purchase of one or more products, and to present that particular customer while at the POS system with an offer to accept a credit card. Historically, the granting of credit cards commonly relied on an individual deciding to acquire a particular credit card, and then filling out and submitting an application for that credit card from a corresponding particular credit card company. It had been determined that it can be advantageous for a retailer to increase the number of customers using credit cards (e.g., to increase transaction speed and/or decrease logistical inefficiencies that may be associated with cash transactions), or at least using one or more particular kinds of credit cards from one or more particular credit card companies. Some embodiments apply machine learning models relative to retail customer information to provide prescreening evaluations relative to one or more criteria in predicting a likelihood that a customer would be willing to agree to apply and/or accept a credit card if offered. Some embodiments provide systems and methods to apply one or more machine learning models to evaluate potential customers and using that evaluation to control point of sale (POS) systems while the customer is at the POS system purchasing one or more products in offering a credit card to a particular customer while that customer is at the POS system.

Generally speaking, pursuant to various embodiments, systems, apparatuses and methods are provided herein useful to control retail point of sale (POS) systems in transactions between a retail entity and a customer. Some embodiments provide systems to control retail POS systems completing payment method offers, the system comprising: a customer profile database storing customer information about customers that shop from a retail entity; a product database storing product information about products offered for sale through the retail entity; a training data database storing machine learning training data comprising historic customer information comprising historic purchase information; a customer evaluation system comprising an evaluation processor communicatively coupled over a distributed communication network with the customer profile database and the product database, wherein the evaluation processor can be configured to implement one or more machine learning acceptance probability models trained based on the machine learning training data relative to the customer information for each of at least a subset of customers and identify an acceptance likelihood factor corresponding to a likelihood that each of the subset of customers can be predicted to accept a payment method offer, and determine whether the each respective customer has a corresponding acceptance likelihood factor greater than a likelihood threshold value of accepting the payment method offer; and a plurality of point of sale (POS) systems configured to complete sales transactions of products between customers and the retail entity, wherein the POS systems can be communicatively coupled over the distributed communication network with a remote third party payment method offer entity, and wherein each of the POS systems can be configured to obtain customer identifying information of at least a subset of customers of a plurality of respective customers purchasing products through the respective POS system and communicate the customer identifying information to the customer evaluation system; wherein the customer evaluation system can be configured to receive a first customer identifying information, from a first POS system of the plurality of POS systems in response to the first POS system identifying a first customer attempting to purchase one or more products, and communicate at least some of first customer information corresponding to the first customer to the payment method offer entity when the first customer has a first acceptance likelihood factor greater than a likelihood threshold value, wherein the payment method offer entity is not the retail entity and not controlled by the retail entity; and wherein first POS system can be configured to receive authorization from the payment method offer entity to present the first customer with a first payment method offer, of multiple different payment method offers, in response to the payment method offer entity evaluating the first customer and determining the first customer satisfies an offer threshold associated with the first payment method offer, and to present the first payment method offer.

Other embodiments provide methods of controlling retail point-of-sale systems completing payment method offers. The methods, in some implementations, comprise: training one or more machine learning acceptance probability models based on the machine learning training data relative to customer information for each of at least a subset of customers, wherein the machine learning training data can be stored in a training data database and comprising historic customer information comprising historic purchase information; implementing, through a customer evaluation system, the one or more acceptance probability models and identifying an acceptance likelihood factor corresponding to a likelihood that each of the subset of customers is predicted to accept a payment method offer; determining for each customer whether the respective acceptance likelihood factor is greater than a likelihood threshold value of accepting the payment method offer; controlling each of a plurality of point of sale (POS) systems, in completing sales transactions of products between customers and a retail entity, obtaining customer identifying information of respective customers purchasing products through the respective POS system and communicating by the respective POS system the customer identifying information to the customer evaluation system; receiving, by the customer evaluation system, a first customer identifying information, from a first POS system of the plurality of POS systems in response to the first POS system identifying a first customer attempting to purchase one or more products; communicating at least some of first customer information corresponding to the first customer to a third party payment method offer entity when the first customer has a first acceptance likelihood factor greater than a likelihood threshold value, wherein the payment method offer entity is not the retail entity and not controlled by the retail entity; receiving, at the first POS system, authorization from the payment method offer entity to present the first customer with a first payment method offer, of multiple different payment method offers, in response to the payment method offer entity evaluating the first customer and determining the first customer satisfies an offer threshold associated with the first payment method offer; and presenting, through the first POS system, the first payment method offer.

FIG. 1 illustrates a simplified block diagram of an exemplary retail point of sale control system 100 to control retail point of sale (POS) systems 102 of one or more retail entities and to complete product sales and further complete payment method offers, in accordance with some embodiments. The retail entities typically sell numerous products. In some implementations, a retail entity sells products through one or more physical, brick-and-mortar stores, online sales, phone orders, kiosk sales and/or other such sales of products. The point of sale control system 100, in some embodiments, includes one or more customer evaluation systems 104 that include one or more evaluation control circuits and/or evaluation processors. Multiple databases 106 are maintained within and/or accessed by the retail POS control system 100. The one or more customer evaluation systems 104 can be communicatively coupled over one or more communications and/or computer networks 108 (e.g., local area network (LAN), wide area network (WAN), Internet, cellular network, Bluetooth network, Wi-Fi network, other such wired and/or wireless networks, or a combination of two or more of such networks) with the POS systems 102 and the databases 106. Further, the point of sale control system 100 further is in communication with one or more third party payment method offer entities 112 that are each configured to present offers to customers to apply for a credit card and/or other payment method. The payment method offer entity 112 may not be the retail entity and may not be controlled by the retail entity.

The databases 106 can include, in some embodiments, one or more of customer databases 106a, product databases 106b, training data databases 106c, machine learning model database 106d, inventory databases, retail associate information databases, and/or other such databases storing retail information. The one or more customer databases 106a can store customer information corresponding to customers that have shopped and/or purchased products from one or more retail entities. In some embodiments, the customer database is implemented through one or more different customer memory systems and/or servers that can be geographically distributed over a wide geographic area and communicatively coupled with the communication network 108. The customer information can include customer identifying information (e.g., name, address, unique customer identifier number, etc.), purchase history information, preference information, delivery information, payment method information previously used by and/or available for use by the respective customer, other such information, or a combination of two or more of such customer information. In some embodiments, the product database 106b is implemented through one or more different product memory systems and/or servers that can be geographically distributed over a wide geographic area and communicatively coupled with the communication network 108. The products database 106b, in some embodiments, can store product information about products offered for sale through the one or more retail entities. The product information can include, for example, product name, bar code information, QR code information, dimensions, weight, quantity information, product type information, demand information, pricing information, discount information, product characteristics (e.g., size, color, style, flavor, etc.), purchase restriction information (e.g., age restriction, prescription requirement information, quantity restriction, legal restrictions, and/or other such restriction information), handling restrictions and/or instructions information, pricing information, related products information (e.g., pairing, relevance to, use with, often purchased with, etc.), other such product information, or a combination of two or more of such product information.

In some embodiments, the training data database 106c is implemented through one or more different training memory systems and/or servers that can be geographically distributed over a wide geographic area and communicatively coupled with the communication network 108. The one or more a training data databases 106c can be configured to store machine learning training data that can include, but not limited to, historic customer information such as historic purchase information, purchase trends and/or other retail features as described below, user shopping actions (e.g., types of products considered by a respective customer, customer Internet shopping browser history, etc.) types of tender or payment methods used by customers, position in time information of when an offer is presented during a purchase transaction (e.g., beginning, middle, end, etc.), number of products purchased in a given purchase transaction, final cost of a purchase transaction, categories of products purchased in a purchase transaction, payment method offer history information (e.g., numbers of one or more types of offers presented, responses over time to one or more offers and/or types of offers, locations of the offers, etc.), other such training data, or a combination of two or more of such training data.

The training data can be dependent on the type of machine learning model or models employed. The machine learning models and/or modeling applications respectively further include the trained, deep learning models that processes the data to determine at least a likelihood of accepting an offer. The learning models can be substantially any relevant modeling, whether custom developed or acquired by a third party. For example, in some embodiments, the trained learning models may include decision trees, XGBOOST, GRID-SEARCHCV, unsupervised learning, regression, clustering, TENSORFLOWLITE model, MOBILENETV2 model, ML KIT for FIREBASE, and substantially any other relevant modeling and supporting applications (e.g., CORE ML, VISION FRAMEWORK, CAFFE, KERAS, XGBOOST, TENSORFLOW, etc.) to implement the modeling. Additionally or alternatively, the machine learning models can comprise a neural network machine learning model, a convolutional neural network, Bayesian network learning, dynamically learned behavior based on, for example, decision tree learning, association rule learning, inductive logic learning, support vector learning, cluster analysis learning, Bayesian network learning, and/or similarity and metric learning, and/or other such modeling.

As introduced above and further described below, the training of the one or more acceptance probability models can repeatedly and/or continuously be updated over time. Such repeated training can utilize some or all of the same training data previously used and/or utilize training data acquired since a last time a model was trained. Such retraining can utilize responses to payment method offers presented to customers over time as well as further customer information and/or retail features. For example, in some embodiments, the customer evaluation system 104 and/or a model training system 118 can be configured receive over time a notification from the POS systems in response to each payment method offer presented to each of numerous different customers. These notifications can include, for example, customer identifying information for whom the respective payment method offers were presented and a response from the respective customer regarding accepting or declining the respective payment method offer. The customer responses can be stored in association with the respective identified customer. The one or more acceptance probability models can be repeatedly retained over time based on the machine learning training data and the customer responses (e.g., daily, weekly, monthly, other such timing or a combination of two or more of such timings). In some embodiments, the customer evaluation system 104 and/or model training system 118 utilize under-sampling in attempts to reduce biasing and/or provide trained models that are less affected by biasing since the customer data and/or the data comprising the responses to purchase method offers is typically highly imbalanced, with the number of declined offers typically greatly superseding the number of accepted offers (e.g., excluding factors such as but not limited to age, gender, financial status, etc.).

Further, in some embodiments, the training data can be continuous updated over time as subsequent purchases are made from the retail entity. This updated training data can be used to repeatedly re-train the one or more machine learning models. In some embodiments, the customer evaluation system 104 can be configured to implement one or more of the machine learning models in evaluating customers as potential candidates to receive a payment method offer, such as an offer to receive a credit card, debit card and/or other such payment method offer. For example, in some implementations, the customer evaluation system 104 can be configured to implement one or more machine learning acceptance probability models trained based on the machine learning training data relative to the customer information for each of at least a subset of customers of the retail entity, and transform relevant customer information, sales information, offer information and/or other relevant information into an acceptance likelihood factor for each customer of the subset. The acceptance likelihood factor can correspond to an estimated likelihood that the respective customer of the subset of customers is predicted to accept a payment method offer to apply for a payment method. The customer evaluation system 104 can determine whether each respective customer has a corresponding acceptance likelihood factor having a predefined relationship with one or more likelihood threshold values of accepting the payment method offer. In some embodiments, the customer evaluation system can compile a likely acceptance listing or pool of those customers having acceptance likelihood factor greater than a likelihood threshold value of accepting the payment method offer.

The POS systems 102 can be configured to complete sales transactions of products between customers and the retail entity. In some embodiments, the POS systems can be communicatively coupled over the distributed communication network 108 with a remote third party payment method offer entity, and each of the POS systems 102 can be configured to obtain customer identifying information of at least a subset of customers of a plurality of respective customers purchasing products through the respective POS system. The customer identifying information can be communicated by the POS system to the customer evaluation system 104. The POS systems 102 can be located at a retail facility (e.g., associate operated POS systems, self-checkout POS systems, etc.), implemented through a customer's portable computing device (e.g., while implementing a retail APP that enables a user to scan products and complete a purchase through the customer's computing device), implemented through a website (e.g., enabling the completion of sales during on-line shopping experience), and/or other such purchasing situations.

Some embodiments include one or more inventory systems 114 communicatively coupled with the communication network 108 that can be configured to track inventory information and/or product quantity information at one or more locations and/or storage locations corresponding to each of at least a subset of the plurality of different products that are available from a respective one of each of one or more retail facilities and/or locations. In some implementations, the inventory system communicates inventory availability information regarding products. Additionally or alternatively, the inventory system 114 in some implantations enables the ordering and/or tracking of shipments of products for one or more retail facilities.

In some embodiments, the retail point sale control system 100 includes and/or can be in communication with one or more delivery control systems 122 each associated with one or more retail facilities from which products can be retrieved and delivered. The delivery control systems 122, at least in part, can be configured to schedule and manage product deliveries from the respective one or more facilities. In some implementations, for example, the delivery control system coordinates deliveries based on locations and allocates the collection of products to one or more particular vehicles, in part, in attempts to focus delivery routes and reduce travel times between deliveries. Other such factors can be taken into account by the delivery control systems 122 to manage delivery and control delivery systems and/or vehicles (e.g., trucks, vans, drones, third party delivery services, etc.).

As described above and further below, the point of sale control system 100 can be configured apply machine learning models to evaluate customers of one or more retail facilities to more accurately identify customers more likely to apply for a method of payment. Further, POS systems 102 can be controlled to present customers with offers to apply for the method of payment. In some embodiments, the evaluation system 104 can be configured to implement one or more machine learning acceptance probability models, which have been trained based on the machine learning training data, relative to the customer information from the customer database 106a for each of at least a subset of the customers of the retail entity. The application of the acceptance probability models to the customer information, in some embodiments, transforms information to provide at least in part an acceptance likelihood factor corresponding to a predicted likelihood that a respective customer is predicted to accept a payment method offer.

The execution of the acceptance probability models can, in some embodiments, be performed independent of the operation of the POS systems 102 and/or independent of when a particular customer is attempting to purchase one or more products through a POS system 102. Further, in some implementations the application of the one or more acceptance probability models to customer data can be repeatedly implemented over time to continue to evaluate customers regardless of whether customers make purchases (e.g., daily, weekly, monthly, other such timing or a combination of two or more of such timings). As such, in some embodiments, the customer evaluation system 104 maintains acceptance likelihood factors for numerous different customers of the one or more retail facilities. For example, a determined acceptance likelihood factor can be maintained in a customer profile or account associated with a particular customer. Similarly, this acceptance likelihood factor can be updated and/or modified over time based on subsequent evaluations and/or applications of the one or more acceptance probability models.

In some embodiments, the customer evaluation system 104 can be configured to receive customer identifying information from a POS system 102, of the plurality of POS systems, in response to the POS system 102 identifying the customer attempting to purchase one or more products. The identification can be based on the customer entering a customer identifying information (e.g., phone number pre-associated with a customer account and/or profile, a user name, an email address, etc.), scanning a customer identifier (e.g., barcode and/or QR code on a customer card, barcode and/or QR code displayed on a portable user computing device (e.g., smartphone, tablet, etc.), etc.), applying an initial method of payment, other such method or a combination of two or more methods. This customer identifying information can be used to identify the customer based, in some implementations, on customer information maintained in the customer database 106a.

The customer evaluation system 104 can further be configured to access the likely acceptance listing to readily identify, based on identifying the customer, whether the identified customer has an acceptance likelihood factor greater than one or more likelihood threshold value of accepting a payment method offer to apply for a particular payment method. In some embodiments, the determination of whether an acceptance likelihood factor is greater than the likelihood threshold can be performed while the customer is at the POS system and implementing the purchase of one or more products without delaying or interfering with the completion of the sale of the one or more products. As described above, in some implementations however, the acceptance likelihood factor can be determined prior to a customer initiating a purchase through the application of one or more of the acceptance probability models and the storing of the determined acceptance likelihood factor (e.g., in a customer profile) such that acceptance likelihood factors have been determined and pre-stored for subsequent access in response to receiving the customer identifying information. Further, in some embodiments, the customer evaluation system 104 can evaluate the determined acceptance likelihood factors relative to one or more likelihood threshold values independent of the POS systems and/or customers initiating purchases through a POS. Different likelihood threshold values may be utilized for different customers depending on one or more threshold factors, such as but not limited to location of the POS system, location of the customer, membership level, time of year, shopping frequency, other such threshold factors, or a combination of two or more of such threshold factors. Based on this evaluation, the customer evaluation system 104 can, in some implementations, identify those customers that have a predicted acceptance likelihood factor that has a predefined relationship with one or more likelihood threshold value, and generate a likely acceptance listing of a plurality of customers that have a threshold likelihood of accepting an offer to apply for a payment method.

Using the customer identifying information, the acceptance likelihood factor can be retrieved in real time and evaluated relative to one or more thresholds. In some embodiments, the customer evaluation system 104 can evaluate the acceptance likelihood factor relative to one or more likelihood threshold values prior to a customer initiating a current purchase transaction at a POS system 102, and determine whether the acceptance likelihood factor has a predefined relationship with a likelihood threshold value independent of the operation of the POS systems and/or prior to a customer initiating a purchase. One or more listings of likelihood candidate customers can be generated and stored by the customer evaluation system 104 of those customers that are determined to have an acceptance likelihood factor that has a predefined relationship with one or more likelihood threshold values. For example, the listing of likelihood candidate customers can be stored, for example, in the customer database and/or a separate database, and subsequently readily accessed at the time a respective customer is identified by a POS system to rapidly identify in real time and while the customer is purchasing products whether the particular customer is included in the likelihood candidate customers and thus whether the customer is determined as having an acceptance likelihood factor that has a predefined relationship with one or more likelihood threshold values.

In some embodiments, the customer evaluation system 104 can be further configured to apply a set of one or more pre-filtering rules to different customer information each corresponding to a different one of a plurality of customers that have previously purchased products from the retail entity. Based on the application of the set of pre-filtering rules, a subset of customers can be identified from the plurality of customers that are being evaluated, and a portion of the plurality of customers can be excluded from consideration for presenting an offer of a method of payment as a function of the pre-filtering rules. The pre-filtering, for at least some of the customers exclude some customer that fail to satisfy one or more filter criteria. The filter criteria can be substantially any relevant criteria that is relevant to whether an offer of a method of payment should be presented to a particular customer. For example, filter criteria may include, but is not limited to, customers that have not previously purchased products from the retail entity may be filtered out and not be considered for an offer, customers that are not a current members of a retail entity may be filtered out, filter out customers that have not been a member of the retail entity for more than a minimum membership duration threshold, filter out customers that have already been granted the payment method, filter out customers that are determined not to be valid or real customers, filter out customers that have opted out of being considered for an offer, filter out customers that have been presented the offer to apply for the payment method less than a previous offer duration threshold (e.g., three months), filter out customers that have declined an offer of the method of payment within an offer decline duration threshold (e.g., declined within the last three months), filter out customers that have applied for the method of payment within an apply duration threshold (e.g., applied within the last three months), filter out customers that have incomplete customer profiles and/or are missing certain customer profile information (e.g., customer name, customer phone number, mailing address, etc.), filter out customers that are not within a predefined age range (e.g., older than 18 years and less than 140 years), other such filter criteria, or a combination of two or more of such filter criteria.

The pre-filtering of potential candidate customers, in part, improves operating performance while reducing computational overhead. Similarly, the pre-filtering can focus the potential candidate customers to those customers that are more likely to be approved by the third party payment method offer entity 112 and/or payment source. As described above and further below, the payment method offer entity 112 may be configured to further and separately evaluate potential customers in determining risk levels and/or whether a customer is a candidate that the offering entity is willing to grant the use of the payment method. As such, the pre-filtering can focus the candidate customer pool to those customers that have established a purchasing history and for which contact information can be verified. Additionally, the pre-filtering reduces the number of candidate customers that are evaluated relative to the one or more acceptance probability models, and thus reduces computation processing, processing time, computations resources and other such benefits. Still further, the pre-filtering can be performed independent of the POS systems and prior to a time when the particular customer initiates a purchase through a POS system.

In some embodiments, the customer evaluation system 104 and/or a POS system 102 can communicate to the payment method offer entity 112 at least some of the customer information corresponding to a respective customer that has been identified by a POS system, and has been determined to be a likelihood candidate customer to receive the payment method offer. Again, in some embodiments, the payment method offer entity 112 is not the retail entity, is not controlled by the retail entity and operates independently of the retail entity. The customer evaluation system, in communicating customer information to the payment method offer entity, can further be configured to prevent the communication of some of the retail customer information, such as but not limited to customer purchase history information, product preferences, method of payment information, other such information or a combination of two or more of such information. Accordingly, the customer evaluation system can limit information provided to the payment method offer entity that may not be relevant to the evaluation of whether to authorize the offer, information that may introduce potential bias, information that is restricted (e.g., based on laws, regulations and/or agreements between the customer and the retail entity), and/or other such information.

Based on the communication to the payment method offer entity 112 of the customer information, the POS system 102 and/or the customer evaluation system 104 can be configured to receive an authorization or other instruction from the payment method offer entity 112 to present the customer with a payment method offer. The customer can be presented with the offer through a user interface (e.g., visual and/or audio interface) of the POS system 102, a user computing device of the customer, separate offer system and/or payment system typically positioned near the POS system 102, and/or other such system. Further, the presented offer typically provides one or more methods of accepting and/or declining the offer. As one non-limiting example, a graphical user interface may be presented to the customer on a display that is visible to the customer, and the customer can select one of one or more options associated with the offer through a touch screen, a keypad associated with the display, a touch pad, a mouse, virtual selection and/or other such selection action. The options can include, for example but not limited to, accept, decline, request more information, and/or other such options. In some embodiments, the payment method offer entity 112 may have multiple different payment method offers and/or payment methods (e.g., different types of credit cards, different levels of servers associated with one or more credit cards, etc.). Accordingly, the payment method offer entity 112 may evaluate the identified customer relative to one or more of multiple different payment method offers. In response to the payment method offer entity 112 evaluating the customer and determining the customer satisfies one or more offer thresholds associated with a respective payment method offer, the payment method offer entity 112 can response to the communication from the POS system 102 and/or customer evaluation system 104. Based on the evaluation the payment method offer entity 112 can communicate the authorization to present the particular offer, decline to authorize the customer the offer, or provide another such response.

In some embodiments, the customer evaluation system 104 and/or the POS system 102 can record or store information that the particular customer was presented with the payment method offer authorized by the payment method offer entity 112. The stored information can include substantially any relevant information corresponding to the office, such as but not limited to a flag or indicator that an offer was made, information about the payment method offer (e.g., which of multiple different payment offers were presented and/or authorized), whether the offer is a single time offer, whether the offer expires, an offer duration or expiration period of time for which the offer remains valid, a date the offer is authorized and/or presented, other such information, or a combination of two or more of such information. Some embodiments further store information about a response to the offer, such as but not limited to whether the offer was accepted, whether the offer was declined, whether additional information was requested, whether a request was selected to delay the offer, and/or other such responses. In some embodiments, the customer evaluation system 104 and/or POS system 102 store the offer data representative that the customer was presented the payment method offer within a previous offer database 106e, the customer database 106, and/or other such storage that is readily accessible by the customer evaluation system 104, the POS systems 102 and/or other such systems.

Information that a customer was previously presented with a payment method offer may be used in subsequent evaluations of whether to represent the offer and/or present a different offer to the customer. In some embodiments, customer evaluation system 104 can be configured to receive customer identifying information from one of the plurality of POS systems 102 in response to the respective POS system identifying the customer attempting to purchase a set of one or more products. Using the customer identifying information, the customer evaluation system can determine whether a payment method offer was previously authorized for the particular customer by the payment method offer entity 112. As a non-limiting example, the customer evaluation system 104 can access the based on a previous offer database 106e to confirm whether the particular customer was previously presented an offer and/or obtain information about one or more offers presented. Based on the determination of whether the customer was previously authorized to receive an offer and/or was presented with an offer, the customer evaluation system 104 can be configured in some embodiments to prevent the re-communication of customer information to the payment method offer entity and/or control a respective POS system 102 and cause the respective POS system to again present the payment method offer without re-communicating at least some if not all of customer information corresponding to the customer to the payment method offer entity 112. Additionally or alternatively, in some embodiments the offer can be re-presented without having to obtain authorization from the payment method offer entity 112, at least when one or more conditions are satisfied (e.g., offer has not expired and/or a duration threshold has not been reached, the payment method offer entity has not withdrawn the authorization to present the offer, other such conditions, or a combination of two or more of such conditions).

Some embodiments further improve the operation of the retail POS control system 100, reduce processing and network bandwidth, and implement further enhancements in part through further pre-processing in determining whether to present an offer to a customer and/or receiving authorization from the payment method offer entity 112. The customer evaluation system can be configured to determine, prior to communicating customer information to the payment method offer entity 112, that a payment method offer was previously authorized for a customer by the payment method offer entity and previously presented to the customer. Further, the customer evaluation system 104, in some applications, can further evaluate that previous presentation to determine whether that presentation of the offer occurred less than a previous offer duration threshold. Based on the previous offer and/or when that previous offer was presented to the customer, the customer evaluation system can prevent the payment method offer from being again presented through the respective POS system to the customer when the payment method offer was presented to the customer and/or presented to the customer less than the previous offer duration threshold.

Additionally or alternatively, the customer evaluation system 104 can be configured to determine that the identified customer has previously declined a payment method offer and/or declined a previous payment method offer within a decline threshold duration of time. A subsequent payment method offer can be prevented from being presented to the customer through the POS system in response to determining that the customer has previously declined a payment method offer within the decline threshold duration of time. Similarly, the customer evaluation system can further improve system resource allocation and operation by preventing customer information from being communicated to the payment method offer entity 112 when the customer has previously declined a payment method offer within the decline threshold duration of time, when the payment method offer was presented to the customer and/or presented to the customer less than the previous offer duration threshold, other such conditions, or a combination of two or more of such conditions.

The application of one or more acceptance probability models to customer information can include applying the acceptance probability models to a set of retail features, at least some of which are typically unavailable to the payment method offer entity 112. Such retail features can include information acquired based on the customer shopping with and/or purchasing products from the one or more retail entities. Such retail features can include substantially any relevant retail features that have relevance to a determination of predicting a likelihood that a customer will accept an offer, including but not limited to a recency feature corresponding to a date the customer most recently purchased a product from the retail entity (recency); a frequency feature corresponding to a number of different occurrences over a frequency period of time that the customer purchased at least one product from the retail entity (frequency); one or more purchase intervals corresponding to a respective duration of time between two different purchase occurrences (interpurchase interval (IPI), e.g., time interval between current and last shopping experience (IPI1), time interval between IPI1 and data before IPI1 (IPI2), time interval between IPI2 and visit date before IPI2 (IPI3), time interval between IPI3 and visit date before IPI3 (IPI4), time interval between IPI4 and date before IPI4 (IPI5), etc.); an amount spent by a customer from an initial shopping instance until a current date (accumulation monetary value); a customer and/or membership level (e.g., basic, premium, ultra) where different levels typically correspond to access different services, discounts, and/or other such benefits (membership tier); an average time interval between last "X" (e.g., 5, 7, 10, etc.) shopping experiences and/or IPI5 (AvgIPI); a maximum time interval or duration between shopping experiences of the last "Y" (e.g., 3, 5, 12, 18, etc.) shopping experiences (MaxIPI); a minimum time interval between shopping experiences over the last "Z" (e.g., 3, 5, 6, 7, 9, 20, etc.) of the last shopping experiences (MinIPI); a number of years the customer has been a member of and/or shopping with the retail entity (tenure); an indicator of whether the customer is enrolled in an automatic renewal of membership (isAutoRenew); number of items bought over a threshold duration that have a base price that is greater than one or more threshold base prices (e.g., greater than $30, greater than $50, greater than $100, etc.) (CostlyItemsBought); a summation of amount spent on items that has a unit base price greater than one or more threshold (e.g., greater than $40, greater than $100, greater than $200, etc.) (AmtSpentOnCostlyItems); number of times the customer has declined an offer from the payment method entity to apply for a method of payment (qsDeclinedCount); a type of tender or payment method used most by the customer (tender type); different types of tender or payment methods used by a customer (types of tender); other such features; or a combination of two or more of such retail features. Other retail features may be compiled based on methods of payment offers presented to the user and/or other users (e.g., offer responses, number of times an offer is presented over time, duration a particular offer has been pending, most resent presentation of an offer, other such features, or a combination of two or more of such features).

The customer evaluation system 104 can be further configured to cause the respective POS system 102 to present the customer with a payment method application interface through which the customer apply for the method of payment. The user interface may allow the customer to input information and/or confirm information auto-populated by the customer evaluation system and/or POS system based on customer information. The respective POS system can communicate the payment method application to the payment method offer entity 112 for consideration.

The customer evaluation system 104 and/or POS system 102 can further be configured to receive, during the purchase transaction while the customer is completing the purchase, from the payment method offer entity 112 an issuance or granting notification granting the respective customer the offered method of payment in response to the customer accepting the offer to apply for the payment method. The POS system 102 can notify and/or the customer evaluation system 104 can cause the respective POS system to notify the customer that the customer has been granted the payment method or tender corresponding to the offer. Still further, the POS system 102 can, in some implementations, be configured to enable the customer to pay for the one or more products being purchased by the first customer using the granted payment method. Additionally or alternatively, the POS system 102 can, upon notification that the payment method has been granted in some implementations, be configured to enable the customer to switch from a previous method of payment already applied during the particular purchase transaction to instead use the granted payment tender to pay for the one or more products.

Figure 2:
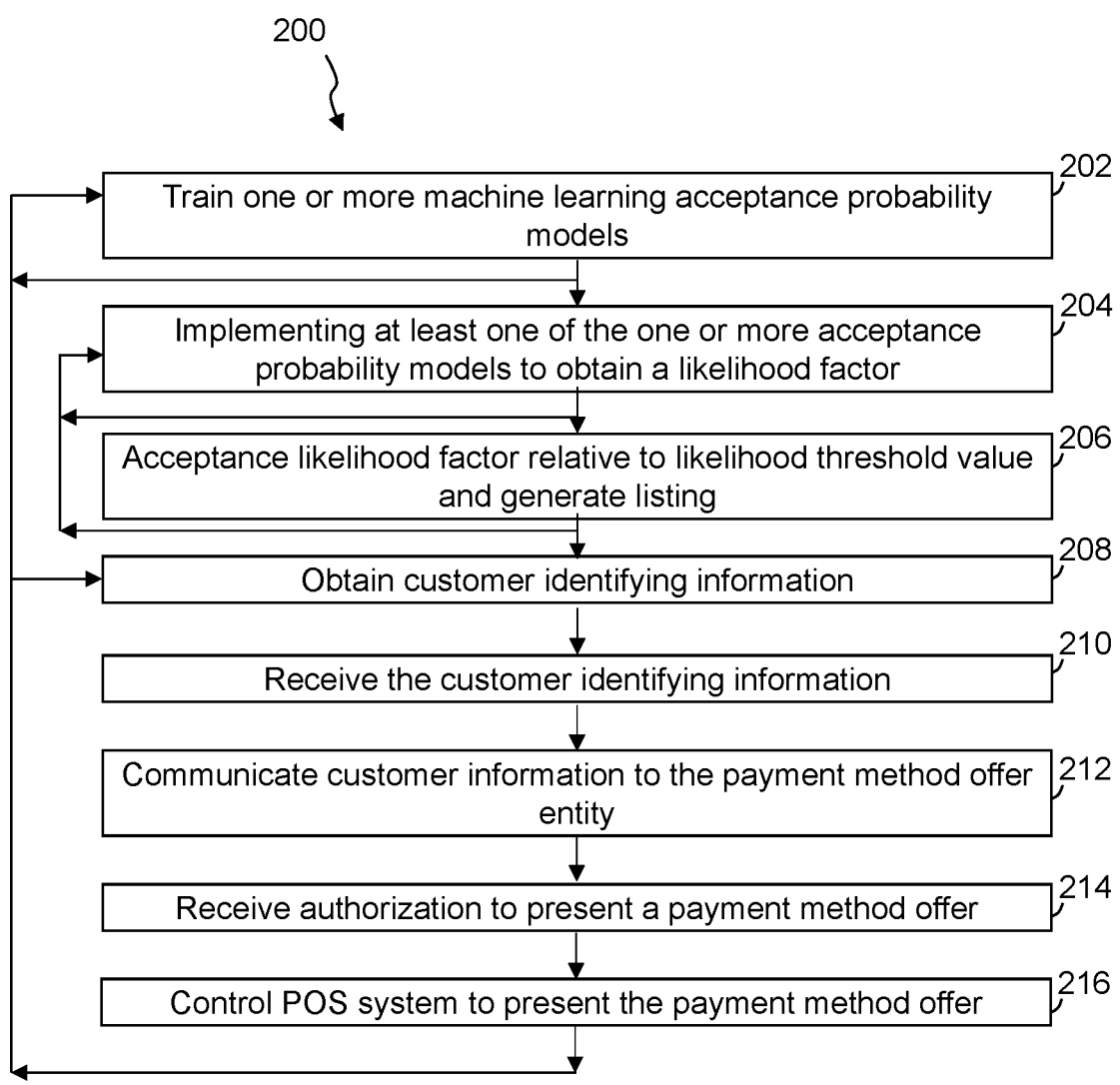
FIG. 2 illustrates a simplified flow diagram of an exemplary process of controlling POS systems in presenting and/or completing payment method offers to customers, in accordance with some embodiments.

FIG. 2 illustrates a simplified flow diagram of an exemplary process 200 of controlling POS systems 102 in presenting and/or completing payment method offers to customers, in accordance with some embodiments. In step 202, one or more machine learning acceptance probability models are trained based on the machine learning training data relative to customer information for each of at least a subset of customers. The machine learning training data can be stored in a training data database 106c and can include, for example, historic customer information comprising historic purchase information.

In step 204, the one or more acceptance probability models can be implemented through the customer evaluation system 104 and an acceptance likelihood factor is generated and/or identified corresponding to a likelihood that each of the subset of customers is predicted to accept a payment method offer. In step 206, it is determined for each customer whether a respective acceptance likelihood factor is greater than a likelihood threshold value of accepting the payment method offer, and a listing is generated of some or all of the customers having an acceptance likelihood factor greater than one or more likelihood threshold values. In step 208, each of a plurality of POS systems 102, configured to complete sales transactions of products between customers and a retail entity, can be configured to obtain customer identifying information of respective customers purchasing products through the respective POS system 102. The customer identifying information can be communicated by the respective POS system 102 to the customer evaluation system 104 in response to confirming that the customer has an acceptance likelihood factor greater than a likelihood threshold value.

In step 210, the customer evaluation system 104 receives customer identifying information from a POS system 102 of the plurality of POS systems in response to the POS system identifying the customer that is attempting to purchase one or more products during a purchasing transaction through the POS system. In step 212, at least some of customer information corresponding to the customer is communicated to the payment method offer entity 112 when the customer is included in an acceptance listing based on the customer have an acceptance likelihood factor greater than a likelihood threshold value. In step 214, authorization is received at the POS system 102 and/or the customer evaluation system 104 from the payment method offer entity 112 to present the customer with a payment method offer, which may be one of multiple potential different payment method offers that might be authorized by the payment offer entity. Typically, the authorization is received in response to the payment method offer entity evaluating the customer and determining that the customer satisfies an offer threshold associated with the payment method offer. In step 216, the payment method offer can be presented through the POS system 102 to the customer for consideration and/or acceptance.

Figure 3:
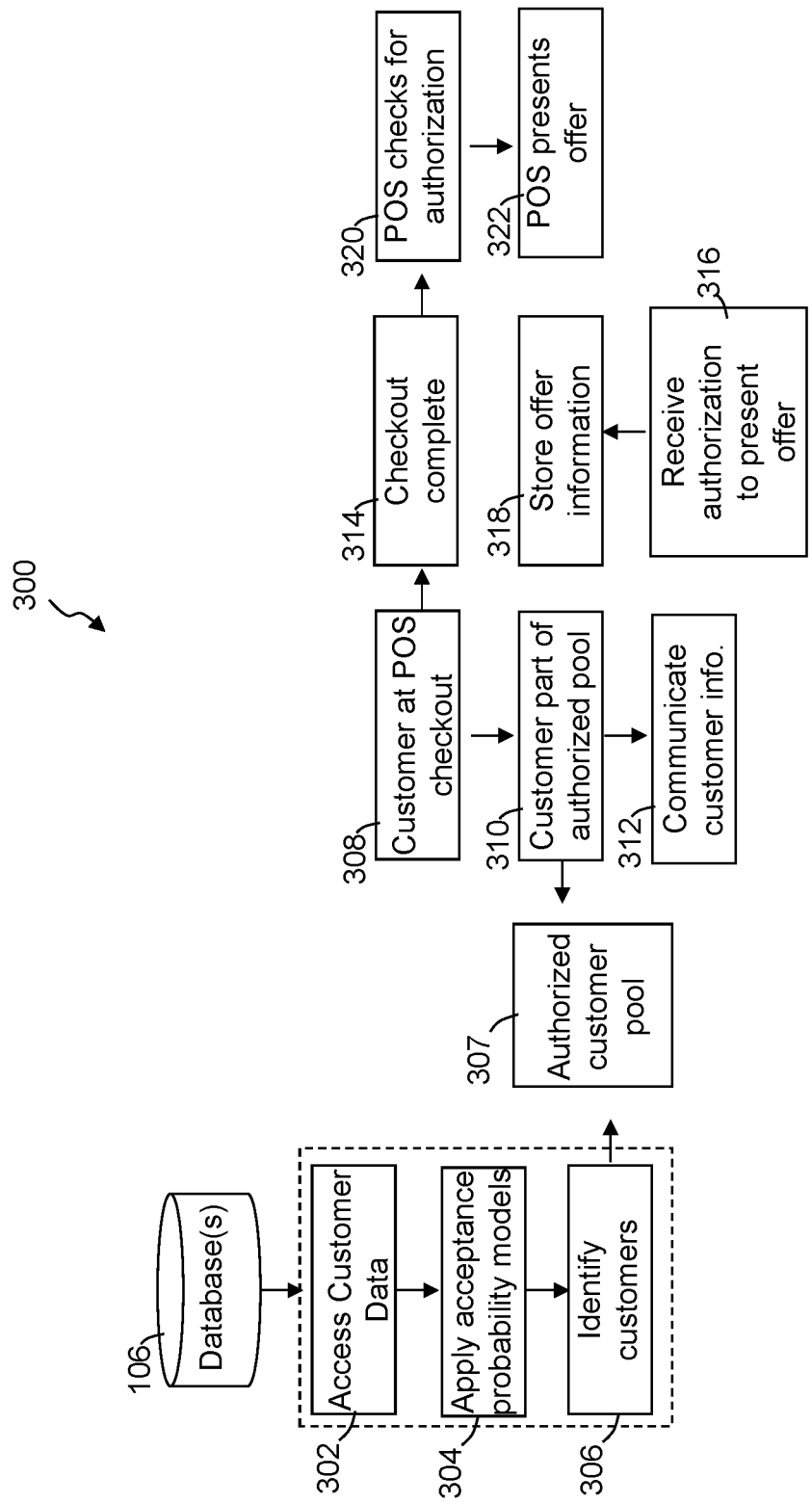
FIG. 3 illustrates a simplified functional flow diagram of an exemplary process that can be implemented by the retail point of sale control system, in accordance with some embodiments.

FIG. 3 illustrates a simplified functional flow diagram of an exemplary process 300 that can be implemented by the retail point of sale control system 100, in accordance with some embodiments. In step 302, model training information is accessed from one or more databases 106 (e.g., customer database, model training database, etc.). In step 304, one or more acceptance probability models are applied to determine acceptance likelihood factors for each of numerous customers (e.g., tens of thousands, millions of customers) associated with one or more retail entitles. In step 306, a subset of customers is identified and an acceptance listing 307 or pool of a subset of customers is compiled that have an acceptance likelihood factor that has a predefined relationship with one or more likelihood threshold values that corresponds to a likelihood that a particular customer is going to accept an offer to apply for an offered method of payment. In some embodiments, steps 302, 304 and 306 can be performed independent of the operation of POS systems and/or prior to a customer initiating a purchase transaction where the customer evaluation system 104 can determine whether to present that customer with an offer. The stored acceptance listing 307 of customers can be readily accessed in real time to quickly determine whether a particular customer has an acceptance likelihood factor that has the predefined relationship with the likelihood threshold. The compilation of the acceptance listing 307 of customers can greatly improve the performance speed of the system, improve response time, reduce bandwidth usage and other such benefits.

In step 308, a POS system initiates a checkout purchase transaction for a particular customer and obtains customer identifying information. In step 310, it is determined whether the identified customer is included in the acceptance listing 307 of customers. Again, because the listing is previously created, that customer evaluation system 104 can rapidly determine whether the customer is considered a likely candidate to receive the offer. In step 312, the customer information is communicated to the payment method offer entity 112 when the customer is included in the listing and has an acceptance likelihood factors that meets the predefined relationship with one or more likelihood threshold values.

In some embodiments, while steps 310 and 312 are being performed, the checkout purchase transaction can continue in step 314. Typically, the checkout process is independent of the determination of whether the customer is provided with an offer to apply for a payment method. In step 316, the payment method offer entity 112 can return an authorization to present an offer to the customer. The offer information 318 can be stored in a database, the POS system 102, the customer evaluation system 104 and/or other storage location for use in presented the offer. In step 320, the POS system 102 can be instructed to present the offer and/or can check to determine whether authorization is received to present the offer. In step 322, the POS system 102 presents the payment method offer to the customer, such as through one or more graphical user interfaces displayed through a display of the POS system 102, the customer's personal computing device, and/or other such systems.

Figure 4:
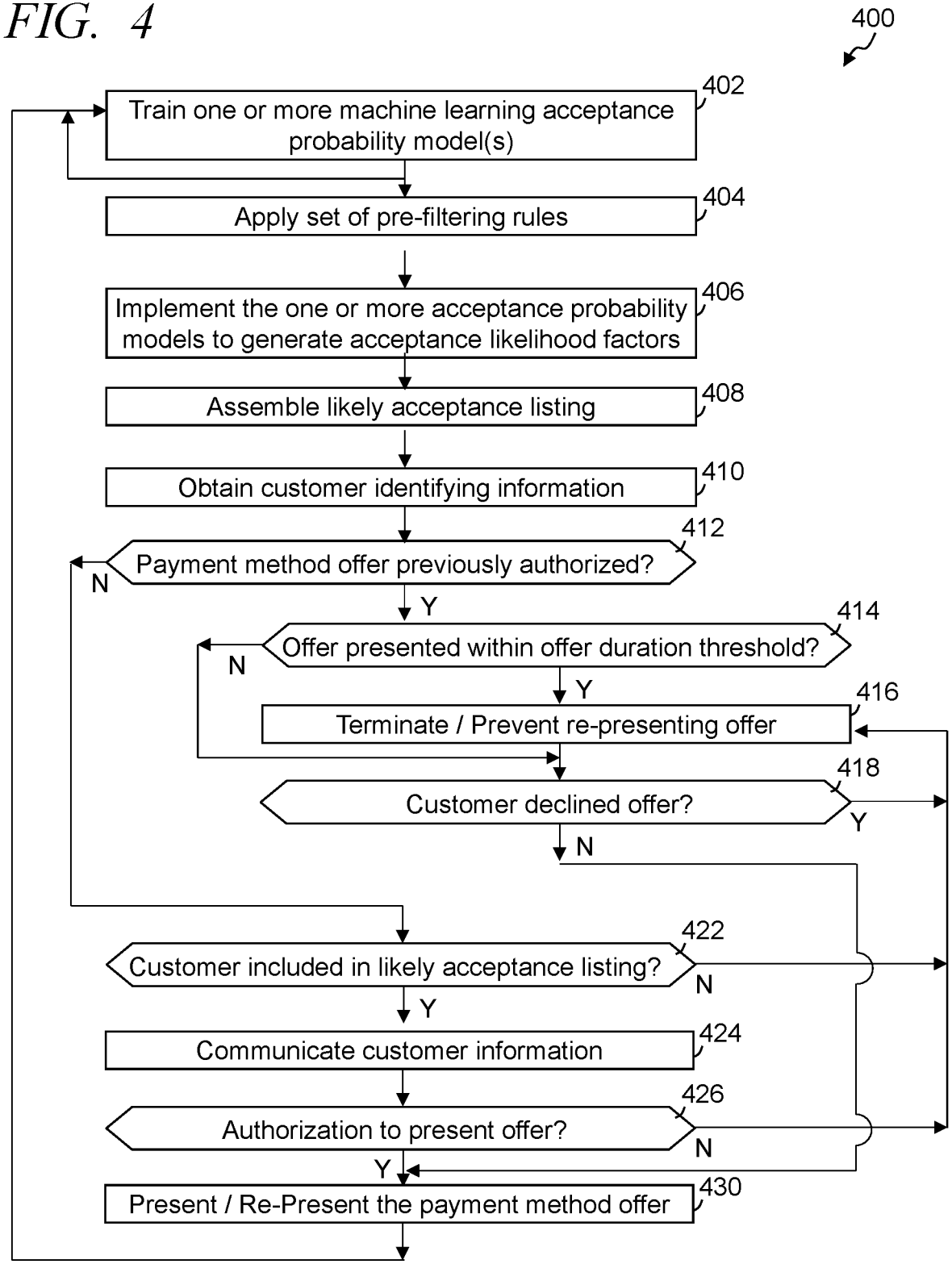
FIG. 4 illustrates a simplified flow diagram of an exemplary process of controlling a POS system in presenting a payment method offer as authorized by a separate payment method offer entity, in accordance with some embodiments.

FIG. 4 illustrates a simplified flow diagram of an exemplary process 400 of controlling a POS system in presenting a payment method offer to a customer as authorized by a separate payment method offer entity 112, in accordance with some embodiments. In step 402, one or more machine learning acceptance probability models are trained based on the machine learning training data relative to customer information for each of at least a subset of customers. The machine learning training data can be stored in a training data database. In some embodiments, the training data can comprise historic customer information such as historic purchase information. In step 404, a set of one or more pre-filtering rules can be applied to different customer information, each set of customer information corresponding to a different one of a plurality of customers that have previously purchased products from the retail entity, and a subset of customers is identified from the plurality of customers to exclude a portion of the plurality of customers from consideration as a function of the pre-filtering rules where the portion of the plurality of customers fail to satisfy one or more filter criteria.

In step 406, the one or more acceptance probability models can be implementing and an acceptance likelihood factor can be identified corresponding to a likelihood that each of the subset of customers is predicted to accept a payment method offer. In applying the acceptance probability models, some embodiments apply the acceptance probability models to data including at least a set of retail features, which are often unavailable to the payment method offer entity 112. The set of retail features can include but is into limited to one or more of a recency feature corresponding to a date a respective customer most recently purchased a product from the retail entity, a frequency feature corresponding to a number of different occurrences over a frequency period of time that the respective customer purchased at least one product from the retail entity, one or more purchase intervals corresponding to a respective duration of time between two different purchase occurrences, other such retail features, or a combination of two or more of such retail features.

In step 408, the acceptance likelihood factors can be evaluated to determine whether the respective customer has an acceptance likelihood factor greater than one or more likelihood threshold values of accepting the payment method offer. When the acceptance likelihood factor greater than the likelihood threshold value, the customer identifying information can be added to a likely acceptance listing 307 or pool of a subset of customers.

In step 410, each of a plurality of POS systems 102 are controlled, while in a process of a sales transaction and as part of completing the sales transactions of products between customers and a retail entity, to obtain customer identifying information of the respective customers purchasing products through the respective POS system. This customer information can be communicated by the respective POS system 102 to the customer evaluation system 104. As described above, the POS systems 102 can be communicatively coupled over the distributed communication network 108 with a remote third party payment method offer entity 112. In embodiments the customer information determined by the POS system can be communicated to the customer evaluation system. In step 412, it can be determined, based on the customer identifying information and/or from a previous offer database, whether a payment method offer was previously authorized for that customer by the payment method offer entity 112.

In step 414, some embodiments determine whether a previously authorized offer was previously presented to the customer less than a previous offer duration threshold. When the offer was not presented to the customer within the previous offer duration threshold, the process can advance to step 418. In step 416, the second payment method offer is prevented from being again presented through the respective POS system 102 to the customer when the previously authorized payment method offer was presented to the second customer less than the previous offer duration threshold. In some embodiments, the process terminates following the determination that the offer should not be re-presented. In other implementations, the process may continue to determine whether a different offer might be presented. Some embodiments further determine whether that offer is still pending and/or valid (e.g., based on one or more offer conditions, such as but not limited to an expiration date, whether the particular offer is still being presented to customers, whether conditions used to evaluate for that offer have changed, and/or other such conditions). When it is determined that the offer is no longer valid the process 400 can advance to step 422.

In step 418, it can be determined whether the customer has previously declined the previously authorized payment method offer within a decline threshold duration of time. When the customer has declined a previous offer within the decline threshold duration of time the process can advance to step 416 where the same or a subsequent payment offer is prevented from being presented to the customer in response. Some embodiments further prevent the customer information from being communicated to the payment method offer entity. When the a previously pending offer has not been declined within the decline threshold the process 400 can advance step 430. In other embodiments, one or more additional or alternative offer conditions can be evaluated prior to controlling the POS system 102 to re-present the previously authorized offer. For example, some embodiments further determine whether that previously authorized offer is still pending and/or valid (e.g., based on one or more offer conditions, such as but not limited to an expiration date, whether the particular offer is still being presented to customers, whether conditions used to evaluate for that offer have changed, and/or other such conditions). When it is determined that the offer valid the process 400 can advance to step 430 where the respective POS system 102 can be controlled to again present the previously authorized payment method offer, and in some instances re-present the offer without re-communicating at least some of customer information corresponding to the customer to the payment method offer entity.

In step 422, the customer identifying information is used to determine whether the customer is included in the likely acceptance listing 307 as having an acceptance likelihood factor that has a predefined relationship with a likelihood threshold value of accepting the payment method offer. When the customer is not included in the likely acceptance listing 307, the process can proceed to step 416 and terminate. In step 424, at least some customer information corresponding to the customer is communicated to the payment method offer entity 112. Typically, the customer information is limited. For example, customer purchase history information can be prevented from being communicated to the payment method offer entity. In step 426, it is determined whether a response from the payment method offer entity 112 authorizes presenting the customer with a payment method offer, which may be one of multiple different payment method offers and is in response to the payment method offer entity evaluating the customer and determining whether the customer satisfies one or more offer thresholds and/or factors associated with the respective payment method offer. When the payment method offer entity does not authorized the presenting of an offer, the process can terminate.

In step 430 the POS system 102 is controlled to present the payment method offer and/or re-present a previous offer to the customer. The customer evaluation system 104 can store, within the customer database, a previous offer database and/or other storage, that an offer was presented to the particular customer. Other offer data representative that the customer was presented the payment method offer may additionally be stored, such as but not limited to a date of presentation, conditions of the offer (e.g., duration an offer is valid, frequency to present the offer, actions to implement if declined, etc.). The process 400 and/or one or more steps or series of steps can be repeated. In some embodiments, a notification may be received from the POS systems in response to each payment method offer presented to each of numerous different customers over time regarding customers. The notification can include customer identifying information for whom the respective payment method offers were presented. In some instances a response from the respective customer regarding accepting or declining the respective payment method offer can also be received. This information and/or the customer response can be stored in association with the identified customer. This information can be subsequently used in further training the one or more acceptance probability models based on the machine learning training data and the customer responses.

Figure 5:
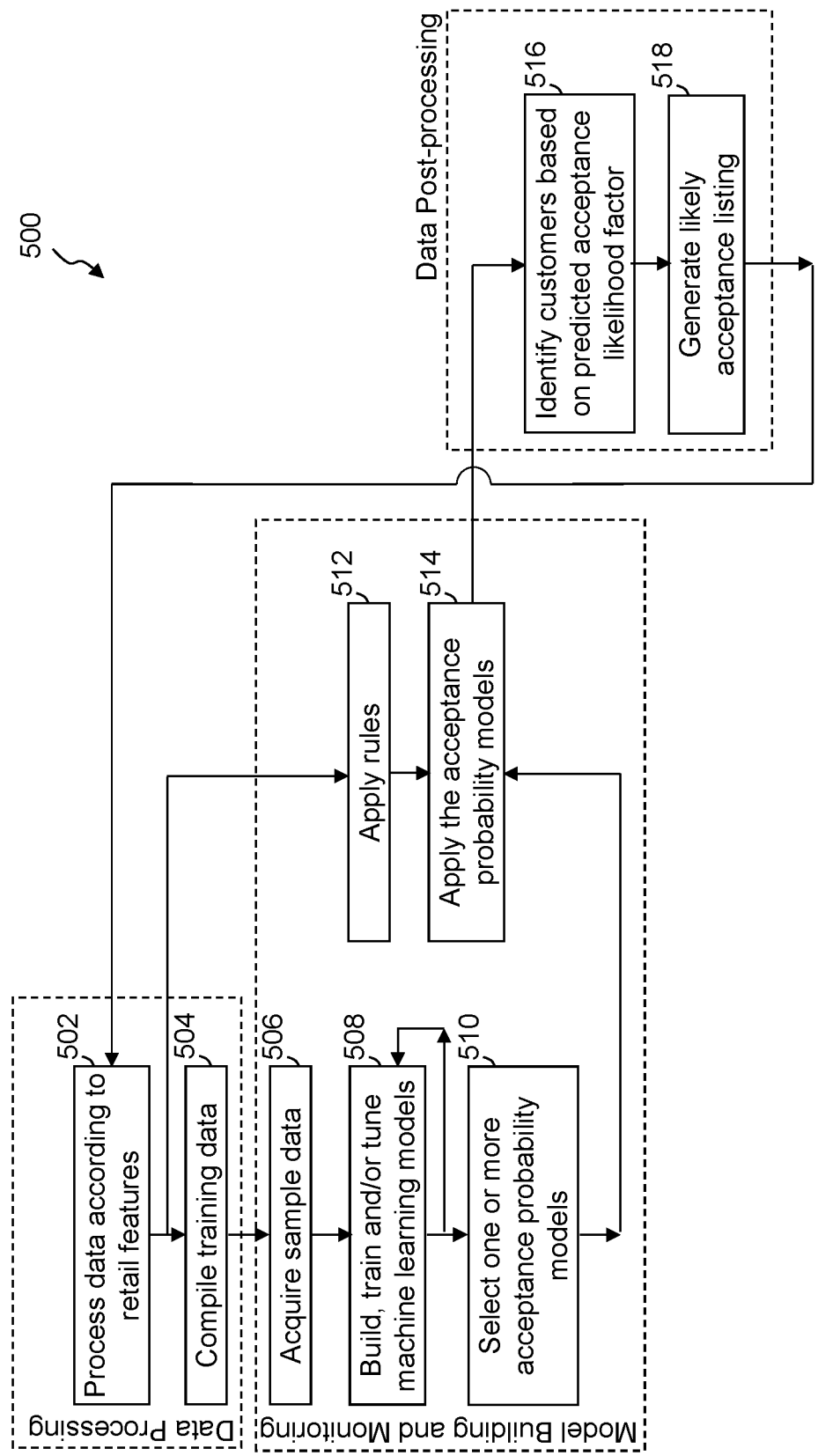
FIG. 5 illustrates a simplified flow diagram of an exemplary process of generating a likely acceptance listing, in accordance with some embodiments.

FIG. 5 illustrates a simplified flow diagram of an exemplary process 500 of generating a likely acceptance listing 307, in accordance with some embodiments. In step 502, retail features are selected and data is processed relative to the retail features to implement a preliminary filter of customer data. As described above, the retail features can include recency, frequency, IPIs, expensive item features, tender type features, and/or other such features. One or more rules can additionally or alternatively be applied (e.g., active membership, existing credit card holder, etc.). Some embodiments employ recency, frequency, monetary (RFM) analysis and/or feature creation, and/or apply one or more RFM machine learning models, as is known in the art. Other filtering and/or rules may additionally or alternatively be applied, such as based on base pre-filtering rules (e.g., whether a customer is a member, duration of membership, existing credit card holder, etc.). Consolidation of information may further be applied.

In step 504 training data is compiled and/or created and models are trained. In step 506, sample data is acquired that is to be used to evaluate, build, and/or tune machine learning models (e.g., XGBOOST, GRIDSEARCHCV, etc.). The sample data can be a subset of customer data and/or artificially generated data. In some implementations, the sampling data is selected at random. Additionally or alternatively, it has been identified that a large majority of customers are not likely to accept a card offer. This large imbalance in sample space can cause the models to be skewed. Some embodiments compensate for this skew by attempting to select training, sampling and/or tuning data that approximately has equal numbers of customers that have accepted an offer and that have not accepted an offer. Some embodiments may tune and/or normalize, scale and/or stylize samples so that categories of different sample data are consistent within the categories. In some embodiments, a feature engineering is performed that can apply label encoding, one-hot encoding, normalization of the data, and/or other such functions. In step 508, the machine learning models are built, trained and/or tuned (e.g., hyperparameter tuning). Some embodiments utilize multiple decision trees to assembly the models. In step 510, one or more acceptance probability models are selected that that provide desired and/or optimal results. Optional filtering, for example based on static rules, may be applied in step 512. In step 514, the acceptance probability models are applied to the customer data. In step 516, customers are identified that have a predicted acceptance likelihood factor that has a predefined relationship with one or more thresholds. In step 518 the likely acceptance listing is generated and consolidated. In some embodiments, the customers may be sorted and/or prioritized based on the predicted acceptance likelihood factor.

By applying the modeling to customer data, the retail entity can pre-evaluate customers. This avoids the payment method offer entity from having to perform such processing, while further enabling the use of private and/or proprietary information that the payment method offer entity typically does not have, while maintaining that information secrete. Similarly, the use of the machine learning models in cooperation the additional customer information provides more accurate predictions of whether a customer is likely to accept an offer, while further improving when and/or how the offers are presented to customers to improve the likelihood that the customer will accept the offer. Additionally, by preprocessing customers to identify those customers having the threshold level of acceptance likelihood factor, the systems and methods can greatly reduce the time needed to determine whether to present the offer, which can allow the systems and methods to increase the number of offers presented while providing those offers to customers predicted to be more likely to accept. As such, the systems and methods enable an increase in a number of customers having the payment method or methods offered by the payment method offer entity, which can result in improvements and/or benefits to the retail entity in part through streamlined purchasing, incentives to customers and/or the retail entity, reduced costs in providing and/or enabling the use of purchasing methods and/or other such benefits. In some embodiments, the systems and methods use machine learning to predict the customers most likely to accept offers of payment methods (e.g., credit cards) based upon a set of business rules, purchase history, size of current shopping basket, date, time, etc. The offers may be proffered to the customers while the customer is at the POS system. The machine learning and multi-factor analytics can provide efficiency gains in percent of acceptance of offers.

The systems and methods optimize the evaluation and determination to present offers providing more efficient and/or more accurate results than the application of static rules alone. Some embodiments evaluate customer behavior over time and build and/or retrain machine learning models to identify relationship between behaviors and a customer's affinity to accept or decline payment method offers. This optimized process can allow the customers with the threshold levels of affinities to be prioritized and/or offered first thereby increasing the quality of a customer pool. The data utilized can include customer information, shopping patterns, purchase behaviors and how many times a customer has declined a similar offer in the past, other such information or a combination of two or more of such information. Once an offer has been made to a customer the offer can remain active for a period of times and potentially re-presented upon subsequent purchasing transactions. In some instances, the offer can remain valid until the member responds with an action (e.g., accepted or declined).

The machine learning models can include a Gradient-Boosted Model that can be built using XGBoost package. The results can contain information such as customer number, a customer's preferred/assigned retail entity and/or location, a probability of the customer will accept the offer, other such information or a combination of two or more of such information. Often the data is highly imbalanced, with the number of instances of declined superseding the number of instances of accepted, some embodiments use under-sampling to limit or avoid the model being unbiased. The under sampling can include, in some instances, a random under sampling. In some embodiments the systems and methods can prioritize customers who are eligible based on their likelihood to respond to the offer and/or accept the offer.

The systems and method can increase the credit card account holders. In some embodiments, the one or more machine learning models are non-linear models to get non-linear relationships between the variables evaluated by the models. Further, the models may be configured to evaluate information related to customers' credit behavior (e.g., credit scores credit history etc.).

Figure 6:
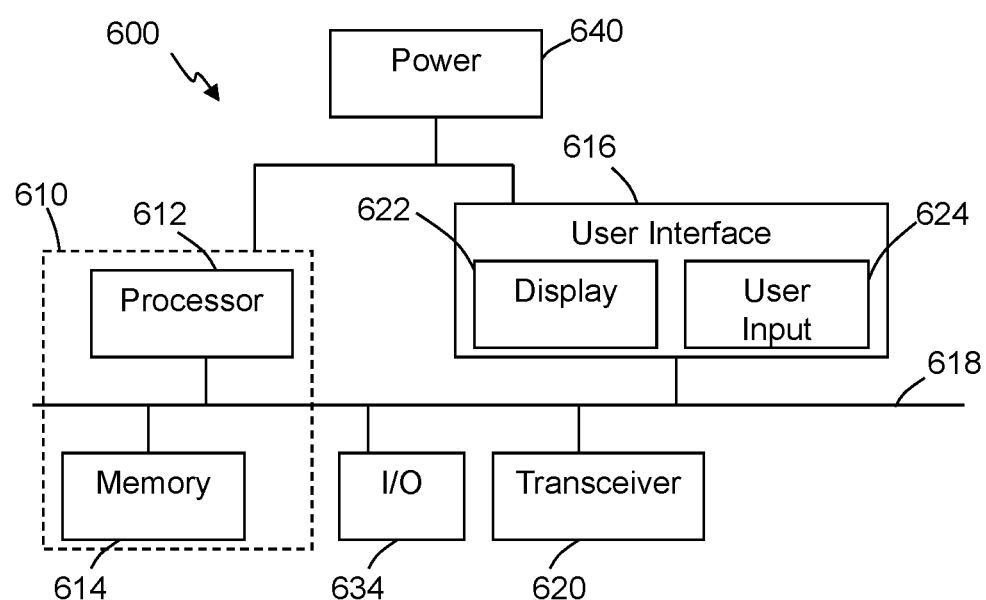
FIG. 6 illustrates an exemplary system for use in implementing methods, techniques, devices, apparatuses, systems, servers, sources and providing for the transformation of information and the control of POS systems, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 6 illustrates an exemplary system 600 that may be used for implementing any of the components, circuits, circuitry, systems, functionality, apparatuses, processes, the POS systems 102, the customer evaluation systems 104, the model training systems 118, and/or other above or below mentioned systems or devices, or parts of such circuits, circuitry, functionality, systems, apparatuses, processes, or devices. However, the use of the system 600 or any portion thereof is certainly not required.

By way of example, the system 600 may comprise one or more control circuits or processor modules 612, one or more memory 614, and one or more communication links, paths, buses or the like 618. Some embodiments may include one or more user interfaces 616, and/or one or more internal and/or external power sources or supplies 640. The control circuit 612 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 612 can be part of control circuitry and/or a control system 610, which may be implemented through one or more processors with access to one or more memory 614 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 600 may be used to implement one or more of the above or below, or parts of, components, circuits, systems, processes and the like.

The user interface 616 can allow a user to interact with the system 600 and receive information through the system. In some instances, the user interface 616 includes a display 622 and/or one or more user inputs 624, such as buttons, touch screen, track ball, keyboard, mouse, etc., which can be part of or wired or wirelessly coupled with the system 600. Typically, the system 600 further includes one or more communication interfaces, ports, transceivers 620 and the like allowing the system 600 to communicate over a communication bus, a distributed computer and/or communication network 108 (e.g., a local area network (LAN), the Internet, wide area network (WAN), etc.), communication link 618, other networks or communication channels with other devices and/or other such communications or combination of two or more of such communication methods. Further the transceiver 620 can be configured for wired, wireless, optical, fiber optical cable, satellite, or other such communication configurations or combinations of two or more of such communications. Some embodiments include one or more input/output (I/O) ports 634 that allow one or more devices to couple with the system 600. The I/O ports can be substantially any relevant port or combinations of ports, such as but not limited to USB, Ethernet, or other such ports. The I/O interface 634 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

The system 600 comprises an example of a control and/or processor-based system with the control circuit 612. Again, the control circuit 612 can be implemented through one or more processors, controllers, central processing units, logic, software and the like. Further, in some implementations the control circuit 612 may provide multiprocessor functionality.

The memory 614, which can be accessed by the control circuit 612, typically includes one or more processor-readable and/or computer-readable media accessed by at least the control circuit 612, and can include volatile and/or nonvolatile media, such as RAM, ROM, EEPROM, flash memory and/or other memory technology. Further, the memory 614 is shown as internal to the control system 610; however, the memory 614 can be internal, external or a combination of internal and external memory. Similarly, some or all of the memory 614 can be internal, external or a combination of internal and external memory of the control circuit 612. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 108. The memory 614 can store code, software, executables, scripts, data, content, lists, programming, programs, log or history data, user information, customer information, product information, and the like. While FIG. 6 illustrates the various components being coupled together via a bus, it is understood that the various components may actually be coupled to the control circuit and/or one or more other components directly.

In some embodiments, a system to control retail point-of-sale systems completing payment method offers and a corresponding method performed by the system, comprises: a customer database storing customer information about customers that shop from a retail entity; a product database storing product information about products offered for sale through the retail entity; a training data database storing machine learning training data comprising historic customer information comprising historic purchase information; a customer evaluation system comprising an evaluation processor communicatively coupled over a distributed communication network with the customer database and the product database, wherein the evaluation processor is configured to implement one or more machine learning acceptance probability models trained based on the machine learning training data relative to the customer information for each of at least a subset of customers and identify an acceptance likelihood factor corresponding to a likelihood that each of the subset of customers is predicted to accept a payment method offer, and determine whether the each respective customer has a corresponding acceptance likelihood factor greater than a likelihood threshold value of accepting the payment method offer; and a plurality of point of sale (POS) systems configured to complete sales transactions of products between customers and the retail entity, wherein the POS systems are communicatively coupled over the distributed communication network with a remote third party payment method offer entity, and wherein each of the POS systems is configured to obtain customer identifying information of respective customers purchasing products through the respective POS system and communicate the customer identifying information to the customer evaluation system; wherein the customer evaluation system is configured to receive a first customer identifying information, from a first POS system of the plurality of POS systems in response to the first POS system identifying a first customer attempting to purchase one or more products, and communicate at least some of first customer information corresponding to the first customer to the payment method offer entity, wherein the payment method offer entity is not the retail entity and not controlled by the retail entity; and wherein first POS system is configured to receive authorization from the payment method offer entity to present the first customer with a first payment method offer, of multiple different payment method offers, in response to the payment method offer entity evaluating the first customer and determining the first customer satisfies an offer threshold associated with the first payment method offer, and to present the first payment method offer.

Some embodiments provide methods of controlling retail point-of-sale systems completing payment method offers, the method comprising: training one or more machine learning acceptance probability models based on the machine learning training data relative to customer information for each of at least a subset of customers, wherein the machine learning training data is stored in a training data database and comprising historic customer information comprising historic purchase information; implementing, through a customer evaluation system, the one or more acceptance probability models and identifying an acceptance likelihood factor corresponding to a likelihood that each of the subset of customers is predicted to accept a payment method offer; determining for each customer whether the respective acceptance likelihood factor is greater than a likelihood threshold value of accepting the payment method offer; controlling each of a plurality of point of sale (POS) systems, in completing sales transactions of products between customers and a retail entity, obtaining customer identifying information of respective customers purchasing products through the respective POS system and communicating by the respective POS system the customer identifying information to the customer evaluation system; receiving, by the customer evaluation system, a first customer identifying information, from a first POS system of the plurality of POS systems in response to the first POS system identifying a first customer attempting to purchase one or more products; communicating at least some of first customer information corresponding to the first customer to a third party payment method offer entity when a first acceptance likelihood factor corresponding to the customer is greater than the likelihood threshold value, wherein the payment method offer entity is not the retail entity and not controlled by the retail entity; receiving, at the first POS system, authorization from the payment method offer entity to present the first customer with a first payment method offer, of multiple different payment method offers, in response to the payment method offer entity evaluating the first customer and determining the first customer satisfies an offer threshold associated with the first payment method offer; and presenting, through the first POS system, the first payment method offer.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system to control retail point-of-sale systems completing payment method offers, the system comprising:
a customer database storing customer information about customers that shop from a retail entity;
a product database storing product information about products offered for sale through the retail entity;
a training data database storing machine learning training data comprising historic customer information comprising historic purchase information;
a previous offer database;
a customer evaluation system comprising an evaluation processor communicatively coupled over a distributed communication network with the customer database and the product database, wherein the evaluation processor is configured to implement one or more machine learning acceptance probability models trained based on the machine learning training data relative to the customer information for each of at least a subset of customers and identify an acceptance likelihood factor corresponding to a likelihood that each of the subset of customers is predicted to accept a payment method offer, and determine whether each respective customer has a corresponding acceptance likelihood factor greater than a likelihood threshold value of accepting the payment method offer; and
a plurality of point of sale (POS) systems configured to complete sales transactions of products between customers and the retail entity, wherein the POS systems are communicatively coupled over the distributed communication network with a remote third party payment method offer entity, and wherein each of the POS systems is configured to obtain customer identifying information of respective customers purchasing products through the respective POS system and communicate the customer identifying information to the customer evaluation system;
wherein the customer evaluation system is configured to receive a first customer identifying information, from a first POS system of the plurality of POS systems in response to the first POS system identifying a first customer attempting to purchase one or more products, and communicate at least some of first customer information corresponding to the first customer to the payment method offer entity when the first customer has a first acceptance likelihood factor greater than a likelihood threshold value, wherein the payment method offer entity is not the retail entity and not controlled by the retail entity;
wherein the customer evaluation system is further configured to store, within the previous offer database, offer data representative that the first customer was presented the first payment method offer,
wherein the customer evaluation system is configured to receive a second customer identifying information, from one of the plurality of POS systems in response to the respective POS system identifying a second customer attempting to purchase a set of one or more products, determine that a second payment method offer was previously authorized for the second customer by the payment method offer entity, and cause the respective POS system to again present the second payment method offer without re-communicating at least some of second customer information corresponding to the second customer to the payment method offer entity; and
wherein first POS system is configured to receive authorization from the payment method offer entity to present the first customer with a first payment method offer in response to the payment method offer entity evaluating the first customer and determining the first customer satisfies an offer threshold associated with the first payment method offer, and to present the first payment method offer.

2. The system of claim 1, wherein the customer evaluation system is configured to receive a second customer identifying information, from one of the plurality of POS systems in response to the respective POS system identifying a second customer attempting to purchase a set of one or more products, determine that a second payment method offer was previously authorized for the second customer by the payment method offer entity and previously presented to the second customer less than a previous offer duration threshold, and prevent the second payment method offer from being again presented through the respective POS system to the second customer when the second payment method offer was presented to the second customer less than the previous offer duration threshold.

3. The system of claim 1, wherein the customer evaluation system is configured to receive a second customer identifying information, from one of the plurality of POS systems in response to the respective POS system identifying a second customer attempting to purchase a set of one or more products, determine that the second customer has previously declined a second payment method offer within a decline threshold duration of time, and prevent a subsequent payment offer from being presented to the second customer in response to determining that the second customer has previously declined a second payment method offer within a decline threshold duration of time.

4. The system of claim 1, wherein the customer evaluation system, in communicating the at least some of first customer information to the payment method offer entity, prevents the communication of customer purchase history information to the payment method offer entity.

5. The system of claim 1, wherein the customer evaluation system, in applying the acceptance probability models, is configured to apply the acceptance probability models to a set of retail features unavailable to the payment method offer entity, wherein the set of retail features comprises a recency feature corresponding to a date the first customer most recently purchased a product from the retail entity, a frequency feature corresponding to a number of different occurrences over a frequency period of time that the first customer purchased at least one product from the retail entity, and one or more purchase intervals corresponding to a respective duration of time between two different purchase occurrences.

6. The system of claim 1, wherein the customer evaluation system is configured to apply a set of pre-filtering rules to different customer information each corresponding to a different one of a plurality of customers that have previously purchased products from the retail entity, and identify the subset of customers from the plurality of customers to exclude a portion of the plurality of customers from consideration as a function of the pre-filtering rules wherein the portion of the plurality of customers fail to satisfy one or more filter criteria.

7. The system of claim 1, wherein the customer evaluation system is configured to: receive a notification, from the POS systems in response to each payment method offer presented to each of numerous different customers, over time and comprising customer identifying information for whom the respective payment method offers were presented and a response from the respective customer regarding accepting or declining the respective payment method offer;

store the customer response in association with the respective identified customer; and retrain the one or more acceptance probability models based on the machine learning training data and the customer responses.

8. A method of controlling retail point-of-sale systems completing payment method offers, the method comprising:

training one or more machine learning acceptance probability models based on a machine learning training data relative to customer information for each of at least a subset of customers, wherein the machine learning training data is stored in a training data database and comprising historic customer information comprising historic purchase information;

implementing, through a customer evaluation system, the one or more acceptance probability models and identifying an acceptance likelihood factor corresponding to a likelihood that each of the subset of customers is predicted to accept a payment method offer;

determining for each customer whether the respective acceptance likelihood factor is greater than a likelihood threshold value of accepting the payment method offer;

controlling each of a plurality of point of sale (POS) systems, in completing sales transactions of products between customers and a retail entity, obtaining customer identifying information of respective customers purchasing products through the respective POS system and communicating by the respective POS system the customer identifying information to the customer evaluation system;

receiving, by the customer evaluation system, a first customer identifying information, from a first POS system of the plurality of POS systems in response to the first POS system identifying a first customer attempting to purchase one or more products;

communicating at least some of first customer information corresponding to the first customer to a third party payment method offer entity when a first acceptance likelihood factor corresponding to the customer is greater than the likelihood threshold value when the first customer has a first acceptance likelihood factor greater than a likelihood threshold value, wherein the payment method offer entity is not the retail entity and not controlled by the retail entity;

storing, within a previous offer database, offer data representative that the first customer was presented the first payment method offer;

receiving a second customer identifying information, from one of the plurality of POS systems in response to the respective POS system identifying a second customer attempting to purchase a set of one or more products;

determining that a second payment method offer was previously authorized for the second customer by the payment method offer entity; and controlling the respective POS system to again present the second payment method offer without re-communicating at least some of second customer information corresponding to the second customer to the payment method offer entity;

receiving, at the first POS system, authorization from the payment method offer entity to present the first customer with a first payment method offer in response to the payment method offer entity evaluating the first customer and determining the first customer satisfies an offer threshold associated with the first payment method offer; and presenting, through the first POS system, the first payment method offer.

9. The method of claim 8, further comprising:

receiving a second customer identifying information, from one of the plurality of POS systems in response to the respective POS system identifying a second customer attempting to purchase a set of one or more products;

determining that a second payment method offer was previously authorized for the second customer by the payment method offer entity and previously presented to the second customer less than a previous offer duration threshold; and preventing the second payment method offer from being again presented through the respective POS system to the second customer when the second payment method offer was presented to the second customer less than the previous offer duration threshold.

10. The method of claim 8, further comprising receiving a second customer identifying information, from one of the plurality of POS systems in response to the respective POS system identifying a second customer attempting to purchase a set of one or more products;

determining that the second customer has previously declined a second payment method offer within a decline threshold duration of time; and preventing a subsequent payment offer from being presented to the second customer in response to determining that the second customer has previously declined a second payment method offer within a decline threshold duration of time.

11. The method of claim 8, wherein the communicating the at least some of first customer information to the payment method offer entity comprises preventing the communication of customer purchase history information to the payment method offer entity.

12. The method of claim 8, wherein applying the acceptance probability models comprises applying the acceptance probability models to a set of retail features unavailable to the payment method offer entity, wherein the set of retail features comprises a recency feature corresponding to a date the first customer most recently purchased a product from the retail entity, a frequency feature corresponding to a number of different occurrences over a frequency period of time that the first customer purchased at least one product from the retail entity, and one or more purchase intervals corresponding to a respective duration of time between two different purchase occurrences.

13. The method of claim 8, further comprising:

applying a set of pre-filtering rules to different customer information each corresponding to a different one of a plurality of customers that have previously purchased products from the retail entity; and identifying the subset of customers from the plurality of customers to exclude a portion of the plurality of customers from consideration as a function of the pre-filtering rules wherein the portion of the plurality of customers fail to satisfy one or more filter criteria.

14. The method of claim 8, further comprising:
receiving a notification, from the POS systems in response to each payment method offer presented to each of numerous different customers over time regarding customers, customer identifying information for whom the respective payment method offers were presented and a response from the respective customer regarding accepting or declining the respective payment method offer,
storing the customer response in association with the identified customer; and
further training the one or more acceptance probability models based on the machine learning training data and the customer responses.

* * * * *